United States Patent
Wang

(10) Patent No.: US 10,717,047 B1
(45) Date of Patent: Jul. 21, 2020

(54) REVERSE OSMOSIS SYSTEM

(71) Applicant: Hsiang-Shih Wang, Changhua (TW)

(72) Inventor: Hsiang-Shih Wang, Changhua (TW)

( * ) Notice: Subject to any disclaimer, the term of this patent is extended or adjusted under 35 U.S.C. 154(b) by 0 days.

(21) Appl. No.: 16/293,431

(22) Filed: Mar. 5, 2019

(51) Int. Cl.
| | |
|---|---|
| *B01D 61/08* | (2006.01) |
| *C02F 1/78* | (2006.01) |
| *B01D 61/02* | (2006.01) |
| *B01D 61/10* | (2006.01) |
| *C02F 1/44* | (2006.01) |

(52) U.S. Cl.
CPC .......... *B01D 61/08* (2013.01); *B01D 61/025* (2013.01); *B01D 61/10* (2013.01); *C02F 1/441* (2013.01); *C02F 1/78* (2013.01); *B01D 2311/08* (2013.01); *B01D 2311/12* (2013.01); *B01D 2311/2634* (2013.01); *B01D 2313/083* (2013.01); *B01D 2313/18* (2013.01); *B01D 2313/243* (2013.01); *B01D 2313/50* (2013.01); *C02F 2201/005* (2013.01); *C02F 2201/782* (2013.01); *C02F 2301/043* (2013.01); *C02F 2303/04* (2013.01)

(58) Field of Classification Search
CPC ...... B01D 61/08; B01D 61/025; B01D 61/10; B01D 2311/08; B01D 2311/12; B01D 2311/2634; B01D 2313/083; B01D 2313/18; B01D 2313/243; B01D 2313/50; C02F 1/441; C02F 1/78; C02F 2201/005; C02F 2201/782; C02F 2201/043; C02F 2303/04

See application file for complete search history.

(56) References Cited

U.S. PATENT DOCUMENTS

| | | | |
|---|---|---|---|
| 6,190,558 B1 * | 2/2001 | Robbins | B01D 61/025 210/134 |
| 6,432,301 B1 * | 8/2002 | Dengler | B01D 61/06 210/97 |
| 9,352,989 B2 * | 5/2016 | Lacasse | C02F 9/00 |
| 9,422,173 B1 * | 8/2016 | Spiegel | C02F 1/441 |

* cited by examiner

*Primary Examiner* — Terry K Cecil

(74) *Attorney, Agent, or Firm* — Che-Yang Chen; Law Office of Michael Chen

(57) ABSTRACT

A reverse osmosis system may include a water supply, a filter, and a mixing member. The water supply is connected to a first water tube and a second water tube. The first water tube is connected to the filter, and the filter is connected to a drain pipe which is connected to a wastewater tank. The wastewater generated from the filter under reverse osmosis process can be discharged into the wastewater tank. The mixing member has a water inlet end, a water outlet end, and a wastewater inlet tube, which are communicated with each other, and the water inlet end of the mixing member is connected to the second water tube. When water flows through the mixing member, the negative pressure is generated to pump wastewater in the wastewater tank through the wastewater inlet tube into the mixing member, thereby achieving the effect of water saving.

10 Claims, 6 Drawing Sheets

REVERSE OSMOSIS SYSTEM

FIELD OF THE INVENTION

The present invention relates to a reverse osmosis system and more particularly to a reverse osmosis system that can recycle wastewater effectively.

BACKGROUND OF THE INVENTION

Reverse osmosis (RO) system is a water purification technology which can remove ions, molecules and particles from drinking water so as to provide clean and safe water for users. However, the process of reverse osmosis system may discharge a large amount of wastewater, which has lower quality and cannot be used directly for washing purpose. Although some user will place a water container to accumulate wastewater for gardening or flushing the toilet afterwards, it is troublesome and low efficiency to manually dispose wastewater. Therefore, there remains a need for a new and improved design for a reverse osmosis system to overcome the problems presented above.

SUMMARY OF THE INVENTION

The present invention provides a reverse osmosis system which comprises a water supply, a filter, and a mixing member. The water supply is connected to a first water tube and a second water tube to split water flow into two directions. The first water tube is connected to the filter at an end thereof other than the water supply, and the filter is connected to a drain pipe which is connected to a wastewater tank. The wastewater generated from the filter under reverse osmosis process is configured to be discharged into the wastewater tank through the drain pipe. The mixing member has a water inlet end, a water outlet end, and a wastewater inlet tube, which are communicated with each other, and the water inlet end of the mixing member is connected to the second water tube. Also, the wastewater inlet tube and the water outlet end are respectively connected to the wastewater tank and a water device. A mixing chamber formed inside the mixing member is communicated with the water inlet end and the water outlet end at two ends thereof. The mixing chamber is communicated with the water inlet end through a tapered water inlet hole which has a gradually-larger diameter from the mixing chamber to the water inlet end while the mixing chamber is communicated with the water outlet end through a tapered water outlet hole which has a gradually-larger diameter from the mixing chamber to the water outlet end. The mixing chamber is communicated with the wastewater inlet tube through at least a pore. The mixing member is connected to the wastewater inlet tube through a first connecting member which comprises a first non-return member installed therein.

In one embodiment, the first non-return member has a first guiding base and a first movable rod, and a first base body is formed at a first end of the first guiding base; a plurality of first guiding holes are formed on the first base body, and the first guiding base has a first tubular hole formed at a second end thereof; the first guiding base is secured between the mixing member and the first connecting member through the first base body, and the first guiding holes on the first base body are communicated with the pore; an end of the first movable rod is inserted into the first tubular hole while the other end thereof is formed into a first sealing plug which is configured to block water flowing through the first connecting member.

In another embodiment, the mixing member comprises a first collecting chamber formed between the pore and the first base body, and the pore and the first guiding holes are communicated through the first collecting chamber.

In still another embodiment, the first movable rod has a first guiding member adjacent to the first sealing plug, and a plurality of first locating portions are formed at an outer peripheral edge of the first guiding member, and each of arc-shaped first recesses is formed between two adjacent first locating portions; the first locating portions of the first guiding member are configured to abut against an inner surface of the first connecting member so as to accessorily limit the shifting direction of the first movable rod; two ends of the first connecting member are communicated through the first recesses.

In a further embodiment, a first O-ring, which is disposed on the first movable rod between the first guiding member and the first sealing plug, is adapted to block water flowing through the first connecting member.

In still a further embodiment, the mixing member is connected to an ozone inlet tube through a second connecting member, and the other end of the ozone inlet tube is connected to an ozonizer; the mixing chamber is communicated with the ozone inlet tube through at least a second pore; the second connecting member comprises a second non-return member installed therein such that when the negative pressure is generated to the second pore, the second non-return member is moved by the negative pressure so as to pump an appropriate number of ozone of the ozonizer through the second connecting member into the mixing chamber to mix with water flowing through the mixing chamber, thereby achieving the effect of sterilization.

In yet a further embodiment, the second non-return member has a second guiding base and a second movable rod, and a second base body is formed at a first end of the second guiding base; a plurality of second guiding holes are formed on the second base body, and the second guiding base has a second tubular hole formed at a second end thereof; the second guiding base is secured between the mixing member and the second connecting member through the second base body, and the second guiding holes on the second base body are communicated with the second pore; an end of the second movable rod is inserted into the second tubular hole while the other end thereof is formed into a second sealing plug which is configured to block water flowing through the second connecting member.

In a particular embodiment, the mixing member comprises a second collecting chamber formed between the second pore and the second base body, and the second pore and the second guiding holes are communicated through the second collecting chamber.

In an advantageous embodiment, the second movable rod has a second guiding member adjacent to the second sealing plug, and a plurality of second locating portions are formed at an outer peripheral edge of the second guiding member, and each of arc-shaped second recesses is formed between two adjacent second locating portions; the second locating portions of the second guiding member are configured to abut against an inner surface of the second connecting member so as to accessorily limit the shifting direction of the second movable rod; two ends of the second connecting member are communicated through the second recesses.

In a preferred embodiment, a second O-ring, which is disposed on the second movable rod between the second guiding member and the second sealing plug, is adapted to block water flowing through the second connecting member.

Comparing with conventional reverse osmosis system, the present invention is advantageous because: (i) with tapered water inlet hole and water outlet hole, the flowing speed is changed when water flows through the mixing member, and the negative pressure generated in the mixing chamber is adapted to pump the appropriate wastewater into the mixing chamber so as to achieve the effect of water saving; and (ii) the mixing member is also connected to the ozonizer, and when the negative pressure is generated in the mixing chamber, an appropriate amount of ozone is configured to flow into the mixing chamber to mix with water so as to achieve the sterilization effect.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
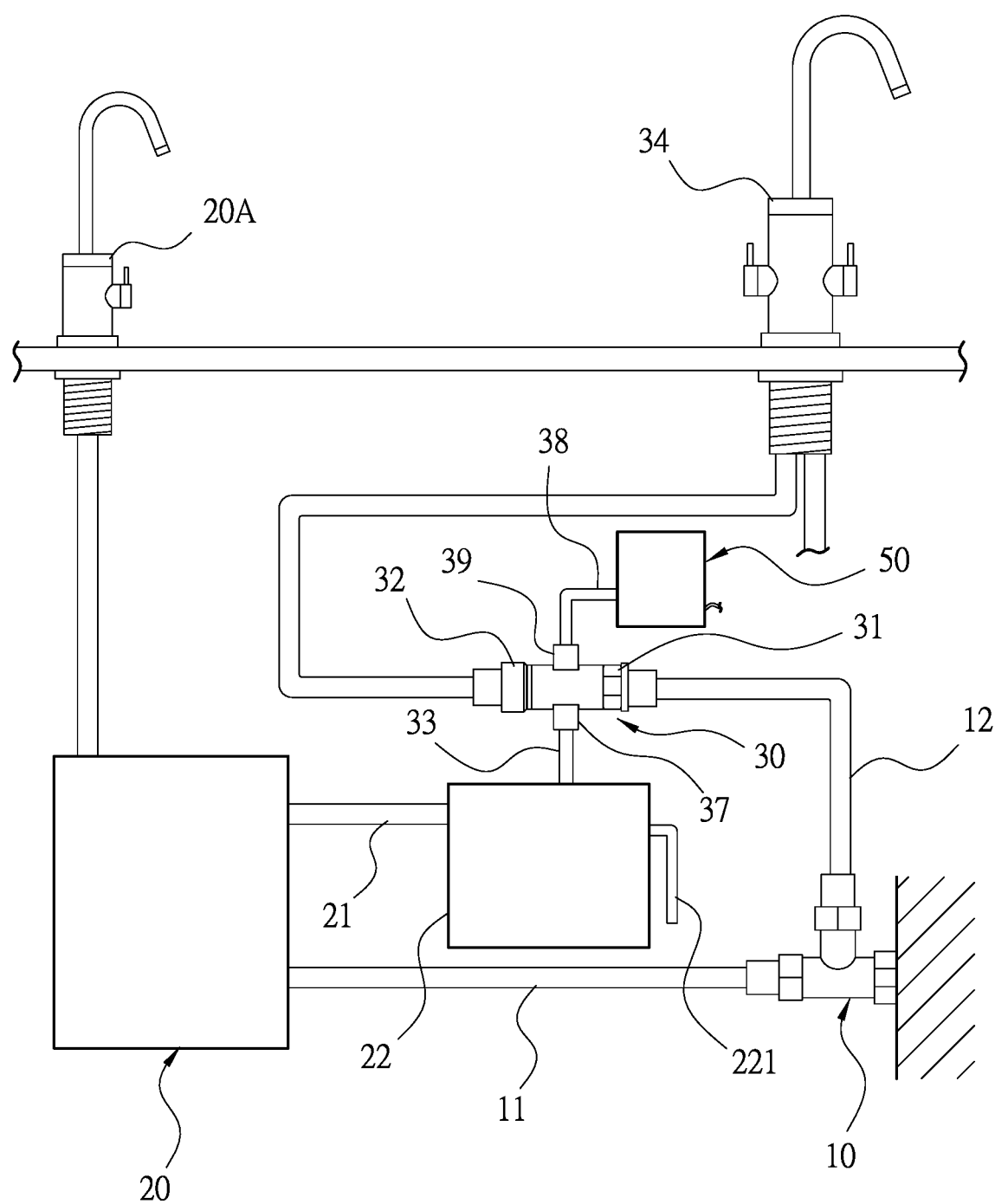
FIG. 1 is a structure diagram of a reverse osmosis system of the present invention.
Figure 2:
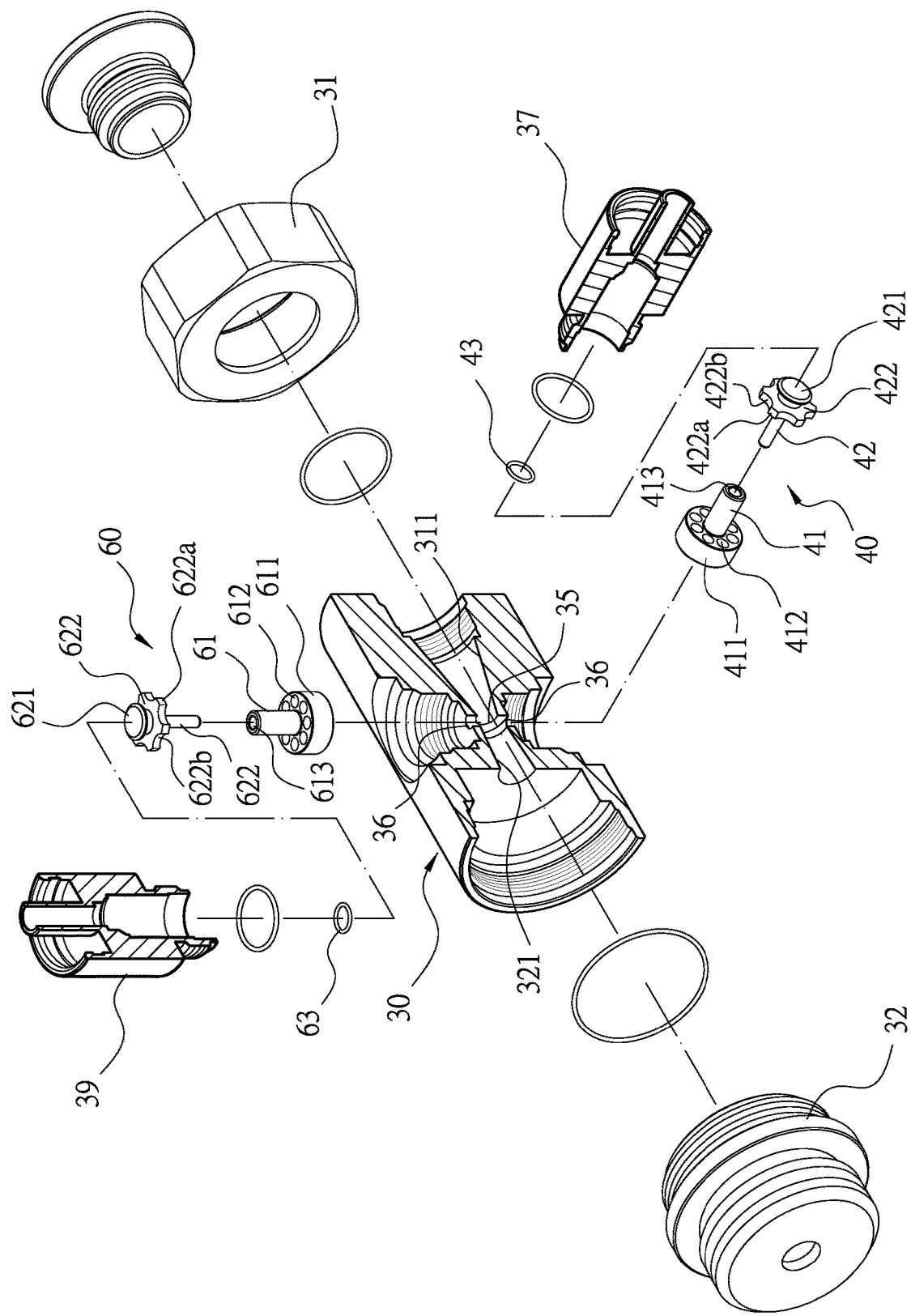
FIG. 2 is a three-dimensional exploded view of the reverse osmosis system of the present invention.
Figure 3:
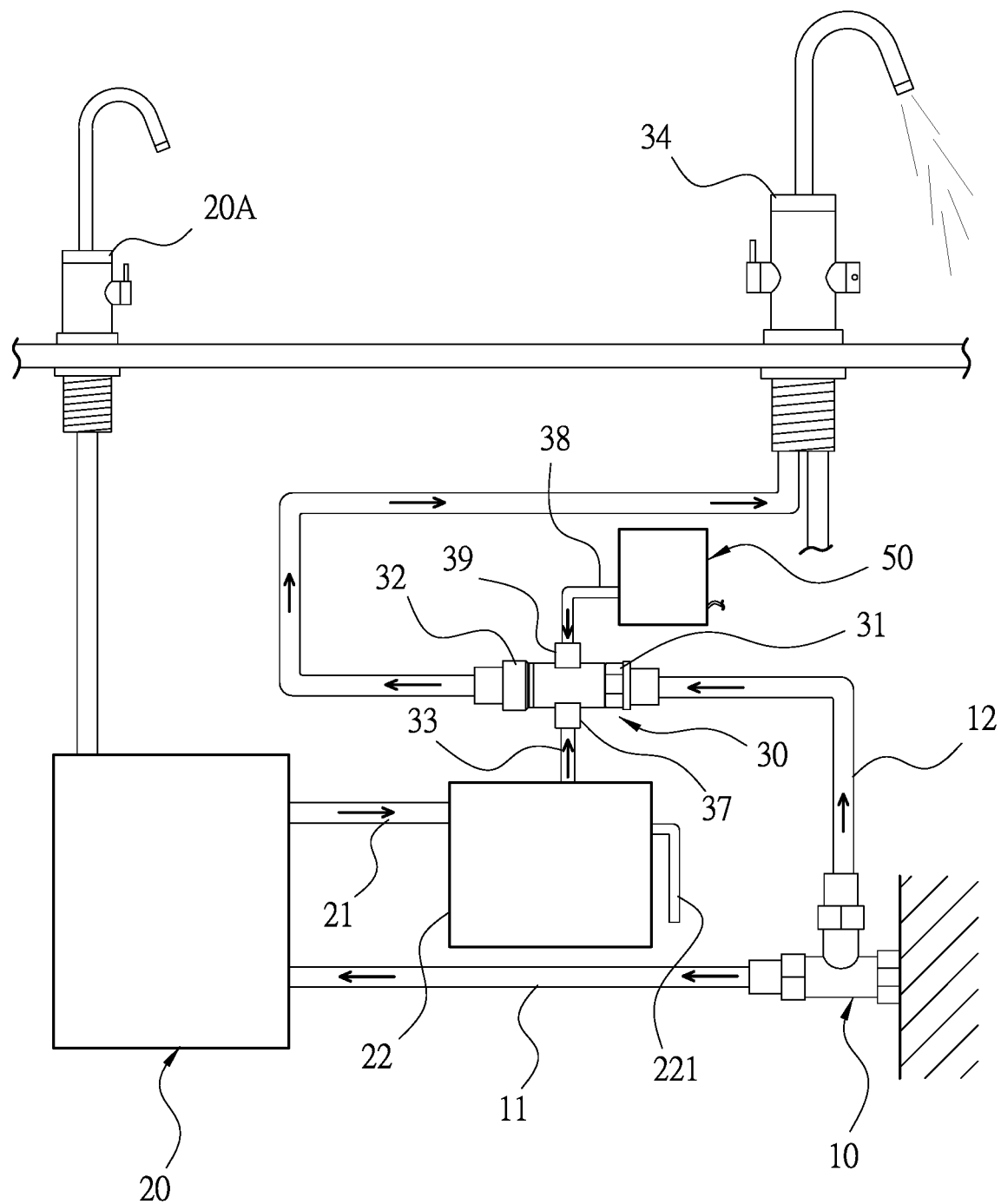
FIG. 3 is a structure diagram of the reverse osmosis system of the present invention when water is used.
Figure 4:
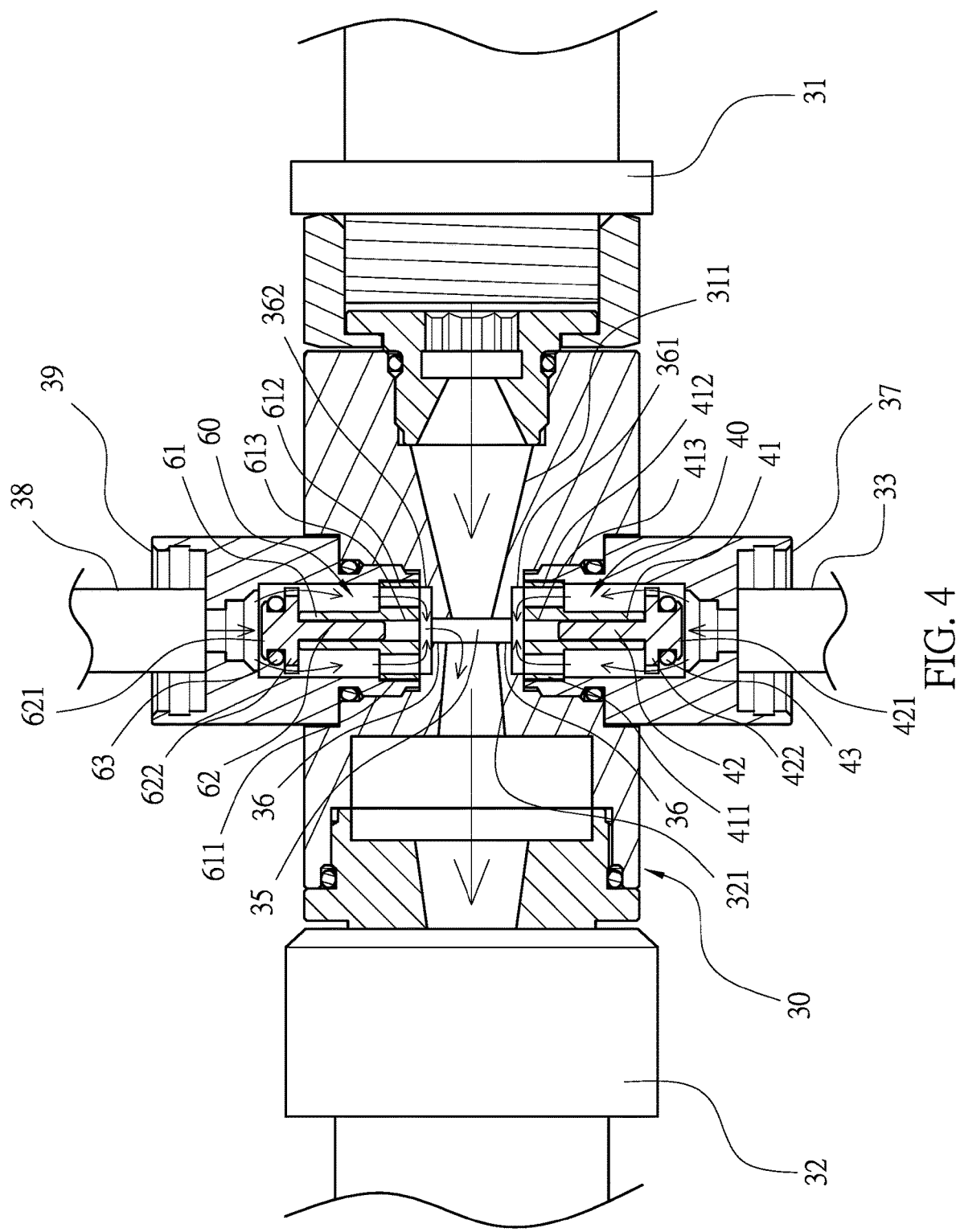
FIG. 4 is a sectional schematic view of the reverse osmosis system of the present invention when water is used.
Figure 5:
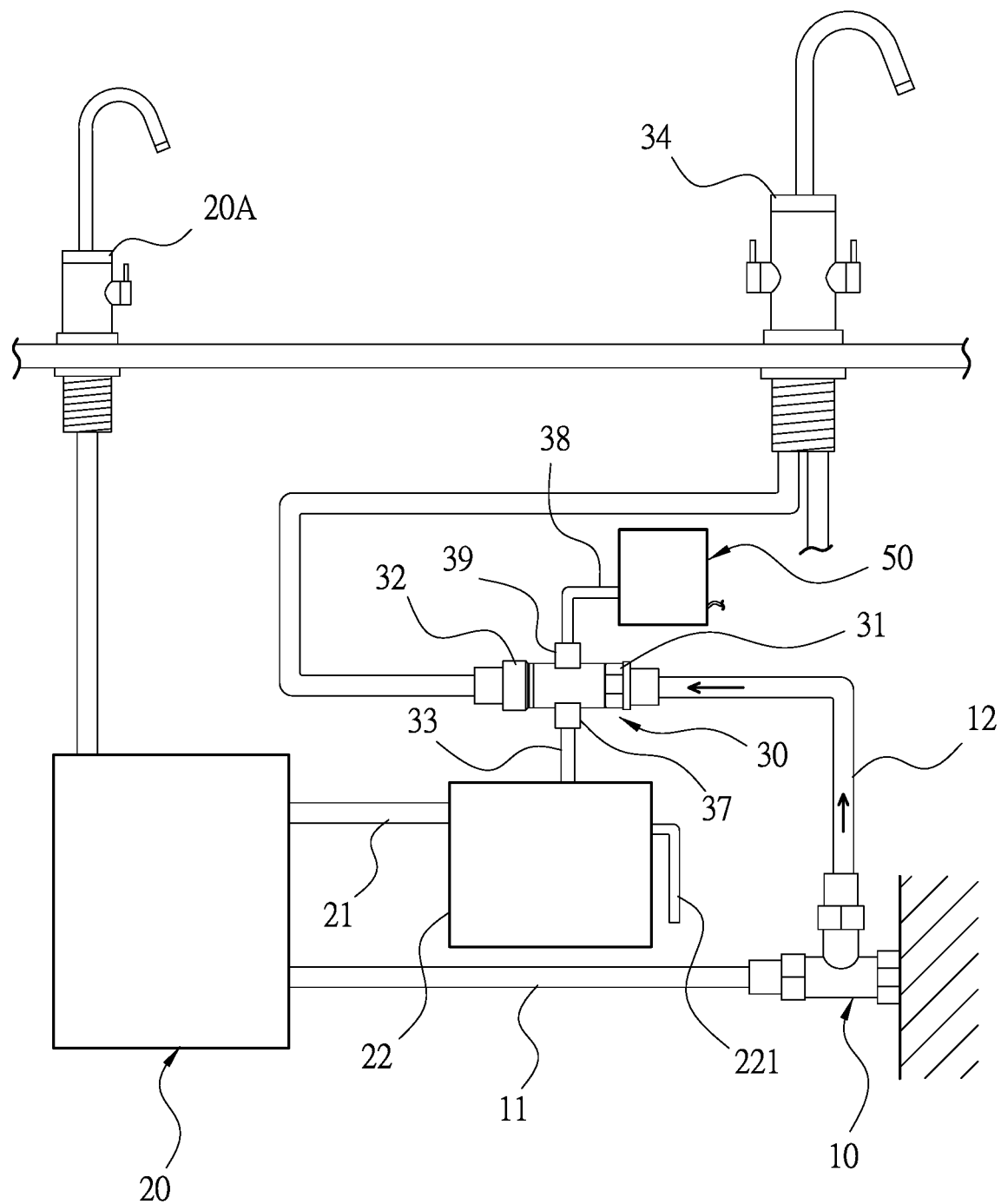
FIG. 5 is a structure diagram of the reverse osmosis system of the present invention when water is turned off.
Figure 6:
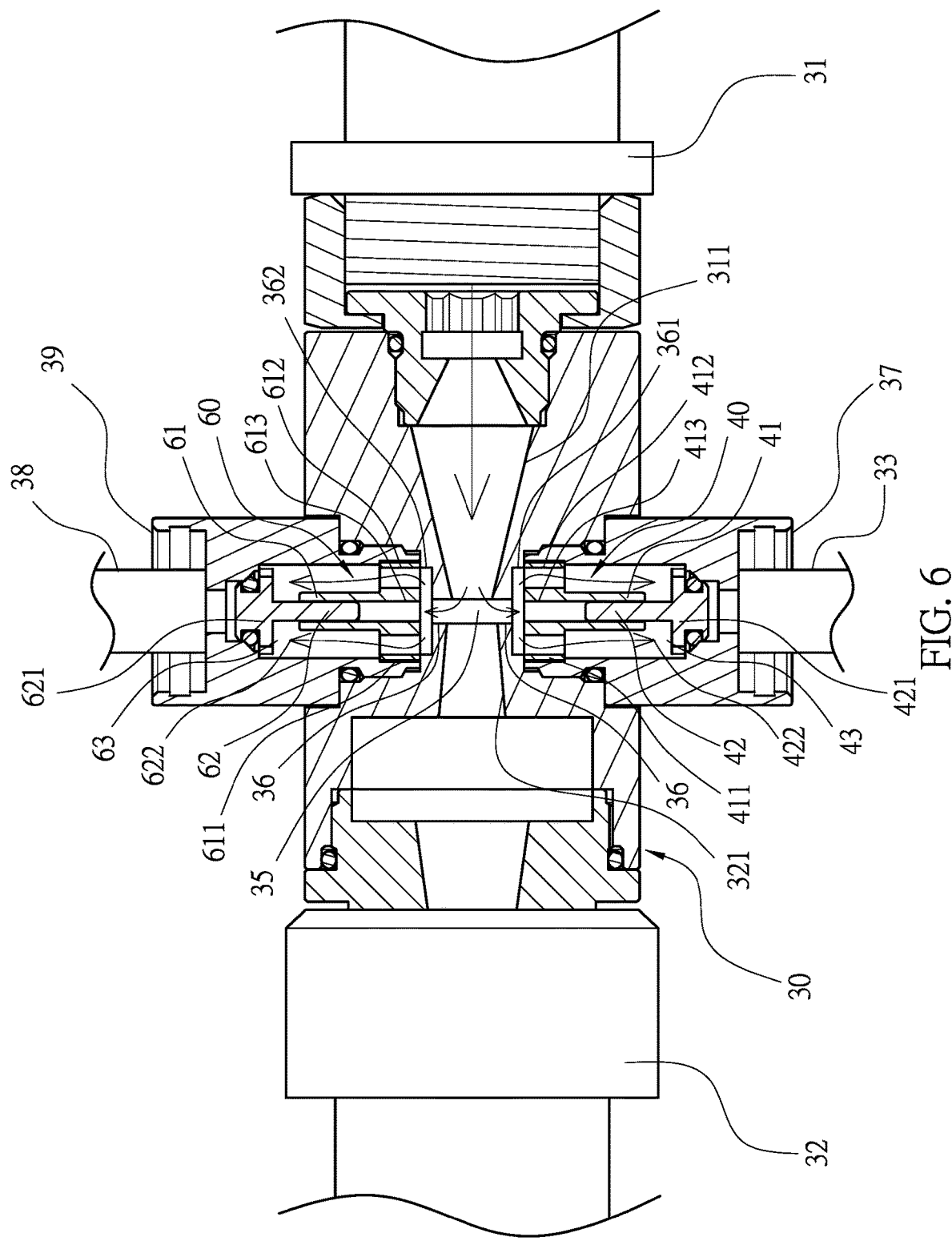
FIG. 6 is a sectional schematic view of the reverse osmosis system of the present invention when water is turned off.

In order to further understand the goal, characteristics and effect of the present invention, a number of embodiments along with the drawings are illustrated as following:

Referring to FIGS. 1 to 2, the present invention provides a reverse osmosis system which comprises a water supply (10), a filter (20), and a mixing member (30). The water supply (10) is connected to a first water tube (11) and a second water tube (12) to split water flow into two directions. The first water tube (11) is connected to the filter (20) at an end thereof other than the water supply (10), and the filter (20) is further connected to a purifier (20A) and a drain pipe (21) which is connected to a wastewater tank (22). The wastewater generated from the filter (20) under reverse osmosis process is configured to be discharged into the wastewater tank (22) through the drain pipe (21), and the purified water through the filter (20) is adapted to flow to the purifier (20A) for use. Also, the wastewater tank (22) is connected to an overflow pipe (221) which is adapted to drain water out of the wastewater tank (22) when the wastewater tank (22) is full. The mixing member (30) has a water inlet end (31), a water outlet end (32), and a wastewater inlet tube (33), which are communicated with each other, and the water inlet end (31) of the mixing member (30) is connected to the second water tube (12). Also, the wastewater inlet tube (33) and the water outlet end (32) are respectively connected to the wastewater tank (22) and a water device (34). A mixing chamber (35) is formed in the mixing member (30). The mixing chamber (35) is communicated with the water inlet end (31) through a tapered water inlet hole (311) which has a gradually-larger diameter from the mixing chamber (35) to the water inlet end (31). Moreover, the mixing chamber (35) is communicated with the water outlet end (32) through a tapered water outlet hole (321) which has a gradually-larger diameter from the mixing chamber (35) to the water outlet end (32). Furthermore, the mixing chamber (35) is communicated with the wastewater inlet tube (33) through at least a pore (36). The mixing member (30) is connected to the wastewater inlet tube (33) through a first connecting member (37) which comprises a first non-return member (40) installed therein. The first non-return member (40) has a first guiding base (41) and a first movable rod (42), and a first base body (411) is formed at a first end of the first guiding base (41). Additionally, a plurality of first guiding holes (412) are formed on the first base body (411), and the first guiding base (41) has a first tubular hole (413) formed at a second end thereof. The first guiding base (41) is secured between the mixing member (30) and the first connecting member (37) through the first base body (411), and the first guiding holes (412) on the first base body (411) are communicated with the pore (36). An end of the first movable rod (42) is inserted into the first tubular hole (413) while the other end thereof is formed into a first sealing plug (421) which is configured to block water flowing through the first connecting member (37). The mixing member (30) comprises a first collecting chamber (361) formed between the pore (36) and the first base body (411), and the pore (36) and the first guiding holes (412) are communicated through the first collecting chamber (361). Also, the first movable rod (42) has a first guiding member (422) adjacent to the first sealing plug (421), and a plurality of first locating portions (422a) are formed at an outer peripheral edge of the first guiding member (422), and each of arc-shaped first recesses (422b) is formed between two adjacent first locating portions (422a). The first locating portions (422a) of the first guiding member (422) are configured to abut against an inner surface of the first connecting member (37) so as to accessorily limit the shifting direction of the first movable rod (42). In addition, two ends of the first connecting member (37) are communicated through the first recesses (422b). A first O-ring (43), which is disposed on the first movable rod (42) between the first guiding member (422) and the first sealing plug (421), is adapted to block water flowing through the first connecting member (37). When water flows from the water inlet hole (311) through the mixing chamber (35) to the water outlet hole (321), the negative pressure generated to the pore

(36) is adapted to move the first non-return member (40) in the first connecting member (37) so as to pump a small amount of wastewater in the wastewater tank (22) through the wastewater inlet tube (33) into the mixing chamber (35) to mix with water flowing through the mixing chamber (35), thereby achieving the effect of water saving.

Furthermore, the mixing member (30) is connected to an ozone inlet tube (38) through a second connecting member (39), and the other end of the ozone inlet tube (38) is connected to an ozonizer (50). Also, the mixing chamber (35) is communicated with the ozone inlet tube (38) through at least a second pore (36). The second connecting member (39) comprises a second non-return member (60) installed therein such that when the negative pressure is generated to the second pore (36), the second non-return member (60) is moved so as to pump an appropriate number of ozone of the ozonizer (50) through the second connecting member (38) into the mixing chamber (35) to mix with water flowing through the mixing chamber (35), thereby achieving the effect of sterilization. The second non-return member (60) has a second guiding base (61) and a second movable rod (62), and a second base body (611) is formed at a first end of the second guiding base (61). Additionally, a plurality of second guiding holes (612) are formed on the second base body (611), and the second guiding base (61) has a second tubular hole (613) formed at a second end thereof. The second guiding base (61) is secured between the mixing member (30) and the second connecting member (39) through the second base body (611), and the second guiding holes (612) on the second base body (611) are communicated with the second pore (36). An end of the second movable rod (62) is inserted into the second tubular hole (613) while the other end thereof is formed into a second sealing plug (621) which is configured to block water flowing through the second connecting member (39). The mixing member (30) comprises a second collecting chamber (362) formed between the second pore (36) and the second base body (611), and the second pore (36) and the second guiding holes (612) are communicated through the second collecting chamber (362). Also, the second movable rod (62) has a second guiding member (622) adjacent to the second sealing plug (621), and a plurality of second locating portions (622a) are formed at an outer peripheral edge of the second guiding member (622), and each of arc-shaped second recesses (622b) is formed between two adjacent second locating portions (622a). The second locating portions (622a) of the second guiding member (622) are configured to abut against an inner surface of the second connecting member (39) so as to accessorily limit the shifting direction of the second movable rod (62). In addition, two ends of the second connecting member (39) are communicated through the second recesses (622b). A second O-ring (63), which is disposed on the second movable rod (62) between the second guiding member (622) and the second sealing plug (621), is adapted to block water flowing through the second connecting member (39).

In actual application, referring to FIGS. 1 to 6, the first water tube (11) is connected to the water supply (10) and the filter (20) at the two ends thereof, and in one embodiment, the filter (20) is a reverse osmosis filter. The filtered water passing through the filter (20) is provided to the purifier (20A) so as to reach quality for use. The wastewater generated from the reverse osmosis process is adapted to flow through the drain pipe (21) into the wastewater tank (22), and when the wastewater tank (22) is full, the overflow pipe (221) is adapted to drain wastewater out of the wastewater tank (22). The second water tube (12) connected to the water supply (10) is connected to the water inlet end (31) of the mixing member (30) so as to keep insides of the second water tube (12) and the water inlet end (31) under an appropriate water pressure. The wastewater inlet tube (33) of the mixing member (30) is connected to the wastewater tank (22), and also the mixing member (30) is connected to the ozonizer (50) through the ozone inlet tube (38). Also, the water outlet end (32) of the mixing member (30) is connected to the water device (34). More specifically, the first connecting member (37) connected between the mixing member (30) and the wastewater inlet tube (33) comprises the first non-return member (40) installed therein, and the first non-return member (40) is secured between the first connecting member (37) and the mixing member (30) through the first base body (411) of the first guiding base (41), and the first guiding holes (412) on the first base body (411) are communicated with the pore (36). The first movable rod (42) is inserted into the first tubular hole (413) of the first guiding base (41) so as to enable the first movable rod (42) to have the axial movement in the first connecting member (37). Also, the first sealing plug (421) is cooperated with the first O-ring (43) to allow or block water flowing between the first guiding holes (412) and the wastewater inlet tube (33). Moreover, the second connecting member (39) connected between the ozone inlet tube (38) and the mixing member (30) has the second non-return member (60) installed therein, and the second non-return member (60) is secured between the second connecting member (39) and the mixing member (30) through the second base body (611) of the second guiding base (61), and the second guiding holes (612) on the second base body (611) are communicated with the second pore (36). The second movable rod (62) is inserted into the second tubular hole (613) of the second guiding base (61) so as to enable the second movable rod (62) to have the axial movement in the second connecting member (39). Furthermore, the second sealing plug (621) is cooperated with the second O-ring (63) to allow or block or block ozone passing between the second guiding holes (612) and the ozone inlet tube (38). When water is provided to the water device (34), water is configured to flow from the water supply (10) through the second water tube (12), the water inlet end (31), the water inlet hole (311), the mixing chamber (35), the water outlet hole (321), the water outlet end (32), to the water device (34). In the process, water is configured to flow through the gradually-smaller diameter of water inlet hole (311) into the mixing chamber (35), and flow out of the mixing chamber (35) through the gradually-larger diameter of water outlet hole (321) so as to change flowing speed of water and thereby to generate the negative pressure to the pore (36). The negative pressure is adapted to pump and move the first guiding member (422) of the first movable rod (42) toward the first guiding base (41) so as to enable the first sealing plug (421) and the first O-ring (43) to detach from the first connecting member (37), thereby allowing the wastewater to flow from the wastewater tank (22) through the wastewater inlet tube (33), the first connecting member (37), the first guiding holes (412), the first collecting chamber (361), the second pore (36) into the mixing chamber (35). Thus, without affecting the quality of water, the appropriate amount of wastewater is mixed in the water flowing in the mixing chamber (35) to achieve the effect of water saving. In addition, when water flowing through the water inlet hole (311), the mixing chamber (35), and the water outlet hole (321), the negative pressure generated on the second pore (36) is configured to pump and move the second guiding member (622) of the second movable rod (62) toward the second guiding base (61) so as to enable the second sealing plug (621) and the second O-ring (63) to detach from the second connecting member (39), thereby allowing ozone to pass from the ozone inlet tube (38), the second recesses (622b), the second guiding holes (612), the second collecting chamber (362), the second pore (36) into the mixing chamber (35). Thus, without affecting the quality of water, the appropriate amount of wastewater and ozone are mixed in the water flowing in the mixing chamber (35) so as to achieve the effect of water saving and sterilization for the water device (34). On the other hand, when the water device (34) is turned off, the water pressure generated in the mixing member (30) is configured to push the first movable rod (42) and the second movable rod (62) back to theirs initial positions so as to cut off the wastewater and ozone mixing in the water.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A reverse osmosis system comprising
   a water supply connected to a first water tube and a second water tube to split water flow into two directions;
   a reverse osmosis filter connected to the first water tube for water inflow and connected to a drain pipe which is connected to a wastewater tank; wastewater, which is generated from the reverse osmosis filter, is configured to be discharged into the wastewater tank through the drain pipe; and
   a mixing member having a water inlet end, a water outlet end, and a wastewater inlet tube, which are communicated with each other, and the water inlet end of the mixing member connected to the second water tube; the wastewater inlet tube and the water outlet end respectively connected to the wastewater tank and a water device; a mixing chamber, which is formed inside the mixing member, communicated with the water inlet end and the water outlet end at two ends thereof; the mixing chamber communicated with the water inlet end through a tapered water inlet hole which has a gradually-larger diameter from the mixing chamber to the water inlet end while the mixing chamber communicated with the water outlet end through a tapered water outlet hole which has a gradually-larger diameter from the mixing chamber to the water outlet end; the mixing chamber communicated with the wastewater inlet tube through at least a pore; the mixing member connected to the wastewater inlet tube through a first connecting member which comprises a first non-return member installed therein; when water flowing from the water inlet hole through the mixing chamber to the water outlet hole, the negative pressure, which is generated to the pore, adapted to move the first non-return member in the first connecting member so as to pump wastewater in the wastewater tank through the wastewater inlet tube into the mixing chamber to mix with water flowing through the mixing chamber, thereby achieving the effect of water saving.

2. The reverse osmosis system of claim 1, wherein the first non-return member has a first guiding base and a first movable rod, and a first base body is formed at a first end of the first guiding base; a plurality of first guiding holes are formed on the first base body, and the first guiding base has a first tubular hole formed at a second end thereof; the first guiding base is secured between the mixing member and the first connecting member through the first base body, and the first guiding holes on the first base body are communicated with the pore; an end of the first movable rod is inserted into the first tubular hole while the other end thereof is formed into a first sealing plug which is configured to block water flowing through the first connecting member.

3. The reverse osmosis system of claim 2, wherein the mixing member comprises a first collecting chamber formed between the pore and the first base body, and the pore and the first guiding holes are communicated through the first collecting chamber.

4. The reverse osmosis system of claim 3, wherein the first movable rod has a first guiding member adjacent to the first sealing plug, and a plurality of first locating portions are formed at an outer peripheral edge of the first guiding member, and each of arc-shaped first recesses is formed between two adjacent first locating portions; the first locating portions of the first guiding member are configured to abut against an inner surface of the first connecting member so as to accessorily limit the shifting direction of the first movable rod; two ends of the first connecting member are communicated through the first recesses.

5. The reverse osmosis system of claim 4, wherein a first O-ring, which is disposed on the first movable rod between the first guiding member and the first sealing plug, is adapted to block water flowing through the first connecting member.

6. The reverse osmosis system of claim 1, wherein the mixing member is connected to an ozone inlet tube through a second connecting member, and the other end of the ozone inlet tube is connected to an ozonizer; the mixing chamber is communicated with the ozone inlet tube through at least a second pore; the second connecting member comprises a second non-return member installed therein such that when the negative pressure is generated to the second pore, the second non-return member is moved by the negative pressure so as to pump the ozone of the ozonizer through the second connecting member into the mixing chamber to mix with water flowing through the mixing chamber, thereby achieving the effect of sterilization.

7. The reverse osmosis system of claim 6, wherein the second non-return member has a second guiding base and a second movable rod, and a second base body is formed at a first end of the second guiding base; a plurality of second guiding holes are formed on the second base body, and the second guiding base has a second tubular hole formed at a second end thereof; the second guiding base is secured between the mixing member and the second connecting member through the second base body, and the second guiding holes on the second base body are communicated with the second pore; an end of the second movable rod is inserted into the second tubular hole while the other end thereof is formed into a second sealing plug which is configured to block water flowing through the second connecting member.

8. The reverse osmosis system of claim 7, wherein the mixing member comprises a second collecting chamber formed between the second pore and the second base body, and the second pore and the second guiding holes are communicated through the second collecting chamber.

9. The reverse osmosis system of claim 8, wherein the second movable rod has a second guiding member adjacent to the second sealing plug, and a plurality of second locating portions are formed at an outer peripheral edge of the second guiding member, and each of arc-shaped second recesses is formed between two adjacent second locating portions; the second locating portions of the second guiding member are configured to abut against an inner surface of the second connecting member so as to accessorily limit the shifting direction of the second movable rod; two ends of the second connecting member are communicated through the second recesses.

10. The reverse osmosis system of claim 9, wherein a second O-ring, which is disposed on the second movable rod between the second guiding member and the second sealing plug, is adapted to block water flowing through the second connecting member.

* * * * *